US012666358B2

(12) United States Patent
    Hong

(10) Patent No.: US 12,666,358 B2
(45) Date of Patent: Jun. 23, 2026

(54) STATE CONTROL METHOD AND ELECTRONIC DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 550 days.

(21) Appl. No.: 18/028,047

(22) PCT Filed: Sep. 25, 2020

(86) PCT No.: PCT/CN2020/117920
    § 371 (c)(1),
    (2) Date: Mar. 23, 2023

(87) PCT Pub. No.: WO2022/061778
    PCT Pub. Date: Mar. 31, 2022

(65) Prior Publication Data
    US 2023/0345363 A1    Oct. 26, 2023

(51) Int. Cl.
    *H04W 76/27*    (2018.01)
    *H04W 36/14*    (2009.01)
    *H04W 36/16*    (2009.01)
    *H04W 52/02*    (2009.01)

(52) U.S. Cl.
    CPC ..... *H04W 52/0216* (2013.01); *H04W 36/144* (2023.05); *H04W 36/165* (2013.01); *H04W 76/27* (2018.02)

(58) Field of Classification Search
    CPC ........... H04W 52/0216; H04W 36/144; H04W 36/165; H04W 76/27; H04W 52/02; H04W 52/0235; Y02D 30/70
    See application file for complete search history.

(56) References Cited

U.S. PATENT DOCUMENTS

| | | | | |
|---|---|---|---|---|
| 10,440,691 | B2 * | 10/2019 | Hong ...................... | H04L 67/63 |
| 2013/0051227 | A1 | 2/2013 | Aoyagi et al. | |
| 2013/0189985 | A1 * | 7/2013 | Mutya ............... | H04W 52/0254 |
| | | | | 455/436 |
| 2014/0044029 | A1 * | 2/2014 | Chou ................ | H04W 52/0216 |
| | | | | 370/331 |
| 2015/0124673 | A1 * | 5/2015 | Ouchi ................... | H04W 52/58 |
| | | | | 370/311 |

(Continued)

FOREIGN PATENT DOCUMENTS

| | | |
|---|---|---|
| CN | 109429293 A | 3/2019 |
| CN | 111543118 A | 8/2020 |

(Continued)

OTHER PUBLICATIONS

ISA State Intellectual Property Office of the People's Republic of China, International Search Report Issued in Application No. PCT/CN2020/117920, Jun. 23, 2021, WIPO, 4 pages.

*Primary Examiner* — Andrew Wendell
(74) *Attorney, Agent, or Firm* — Volpe Koenig

(57) ABSTRACT

A state control method and an electronic device are provided. The method is applied to a base station, and includes: in response to determining a terminal in a connected state needs to save power, sending a signaling to the terminal, where the signaling is used to instruct the terminal to change a communication state with the base station.

20 Claims, 7 Drawing Sheets

First historical time information that the terminal remains in the non-connected state after having changed from the connected state to the non-connected state is obtained ∼ S401

Based on the first historical time information, the first duration is determined ∼ S402

In response to determining a terminal in a connected state needs to save power, a signaling is sent to the terminal, where the signaling is for instructing the terminal to change from a connected state to a non-connected state and remain in the non-connected state for at least the first duration, and/or to change from a first radio access technology currently in use to a second radio access technology ∼ S202

(56) References Cited

U.S. PATENT DOCUMENTS

| | | | | |
|---|---|---|---|---|
| 2016/0143085 A1* | 5/2016 | Cai | ..................... | H04W 76/28 |
| | | | | 370/311 |
| 2020/0145878 A1* | 5/2020 | Jin | ...................... | H04W 60/00 |
| 2020/0260377 A1* | 8/2020 | Jin | ................... | H04W 72/0446 |
| 2020/0314798 A1* | 10/2020 | Fujishiro | .............. | H04W 52/02 |
| 2020/0413476 A1* | 12/2020 | He | ...................... | H04W 80/02 |
| 2021/0195654 A1* | 6/2021 | Lei | ................... | H04W 74/0833 |
| 2021/0203401 A1* | 7/2021 | Tang | ................. | H04W 36/362 |
| 2021/0329561 A1* | 10/2021 | Yu | .................... | H04W 52/0274 |

FOREIGN PATENT DOCUMENTS

| | | |
|---|---|---|
| CN | 111699724 A | 9/2020 |
| WO | 2016/050075 A1 | 4/2016 |

* cited by examiner

In response to determining a terminal in a connected state needs to save power, a signaling is sent to the terminal, where the signaling is for instructing the terminal to change a communication state for communication with the base station — S101

FIG.1

A first duration for which the terminal needs to save power is determined — S201

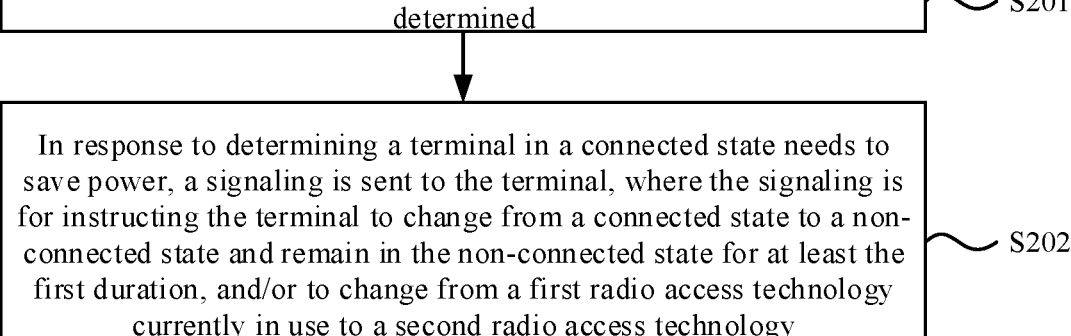

In response to determining a terminal in a connected state needs to save power, a signaling is sent to the terminal, where the signaling is for instructing the terminal to change from a connected state to a non-connected state and remain in the non-connected state for at least the first duration, and/or to change from a first radio access technology currently in use to a second radio access technology — S202

FIG.2

According to first auxiliary information from sent by the terminal, the first duration is determined — S301

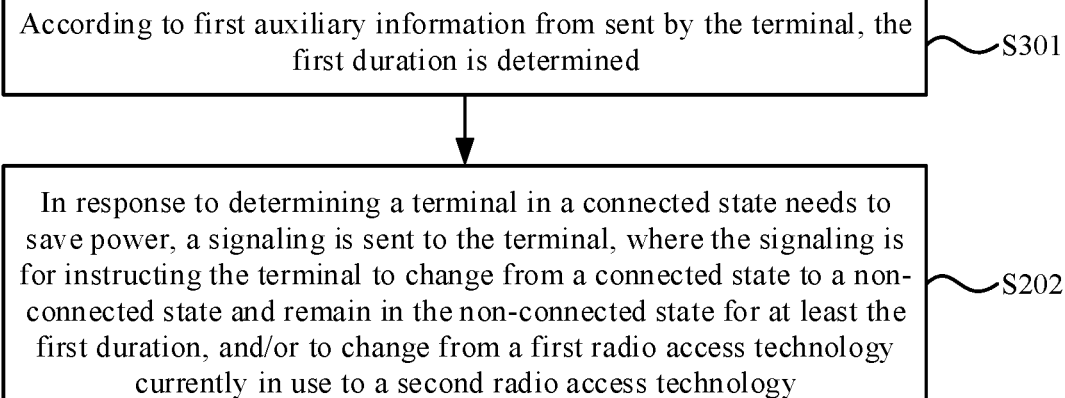

In response to determining a terminal in a connected state needs to save power, a signaling is sent to the terminal, where the signaling is for instructing the terminal to change from a connected state to a non-connected state and remain in the non-connected state for at least the first duration, and/or to change from a first radio access technology currently in use to a second radio access technology — S202

FIG.3

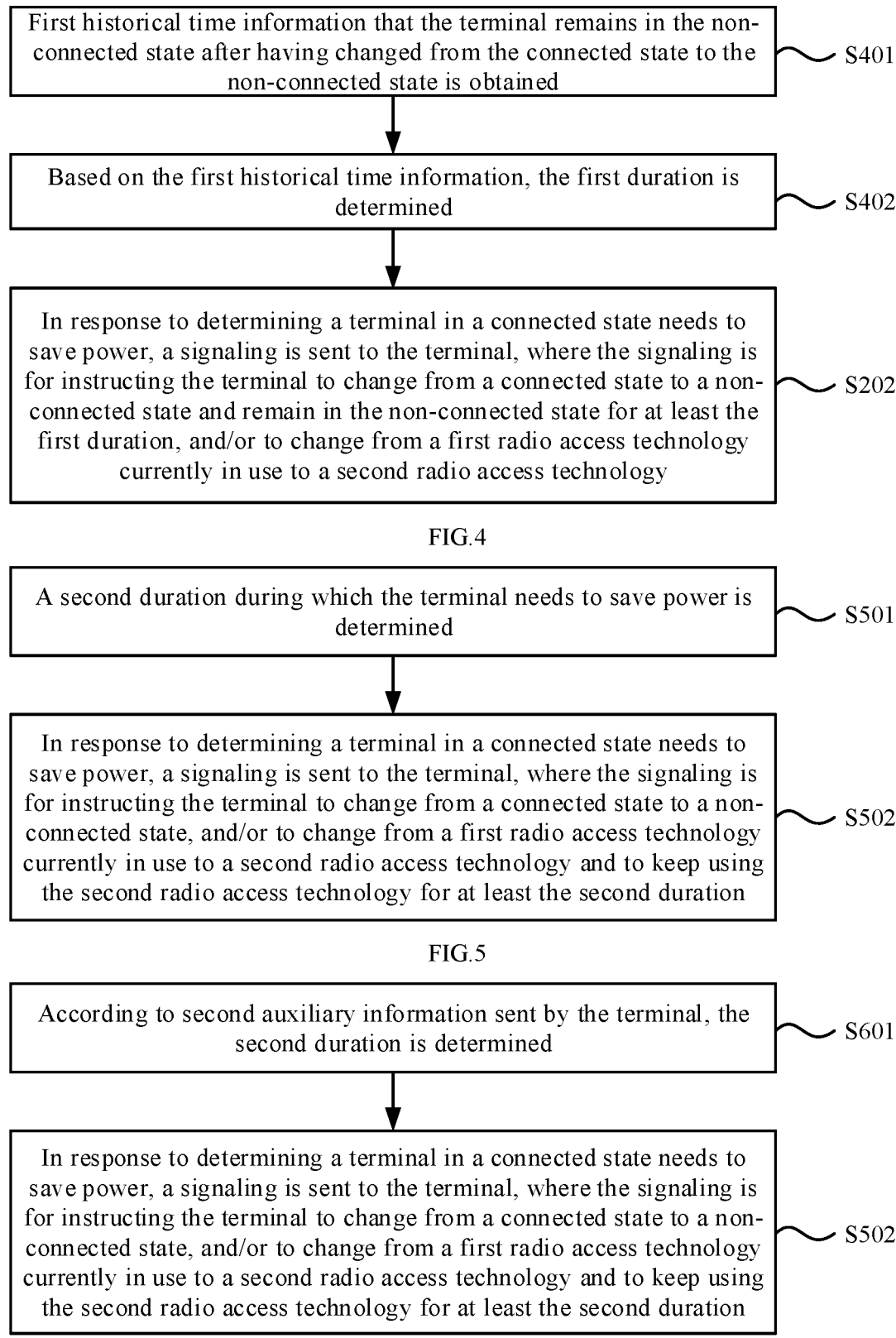

First historical time information that the terminal remains in the non-connected state after having changed from the connected state to the non-connected state is obtained — S401

Based on the first historical time information, the first duration is determined — S402

In response to determining a terminal in a connected state needs to save power, a signaling is sent to the terminal, where the signaling is for instructing the terminal to change from a connected state to a non-connected state and remain in the non-connected state for at least the first duration, and/or to change from a first radio access technology currently in use to a second radio access technology — S202

FIG.4

A second duration during which the terminal needs to save power is determined — S501

In response to determining a terminal in a connected state needs to save power, a signaling is sent to the terminal, where the signaling is for instructing the terminal to change from a connected state to a non-connected state, and/or to change from a first radio access technology currently in use to a second radio access technology and to keep using the second radio access technology for at least the second duration — S502

FIG.5

According to second auxiliary information sent by the terminal, the second duration is determined — S601

In response to determining a terminal in a connected state needs to save power, a signaling is sent to the terminal, where the signaling is for instructing the terminal to change from a connected state to a non-connected state, and/or to change from a first radio access technology currently in use to a second radio access technology and to keep using the second radio access technology for at least the second duration — S502

FIG.6

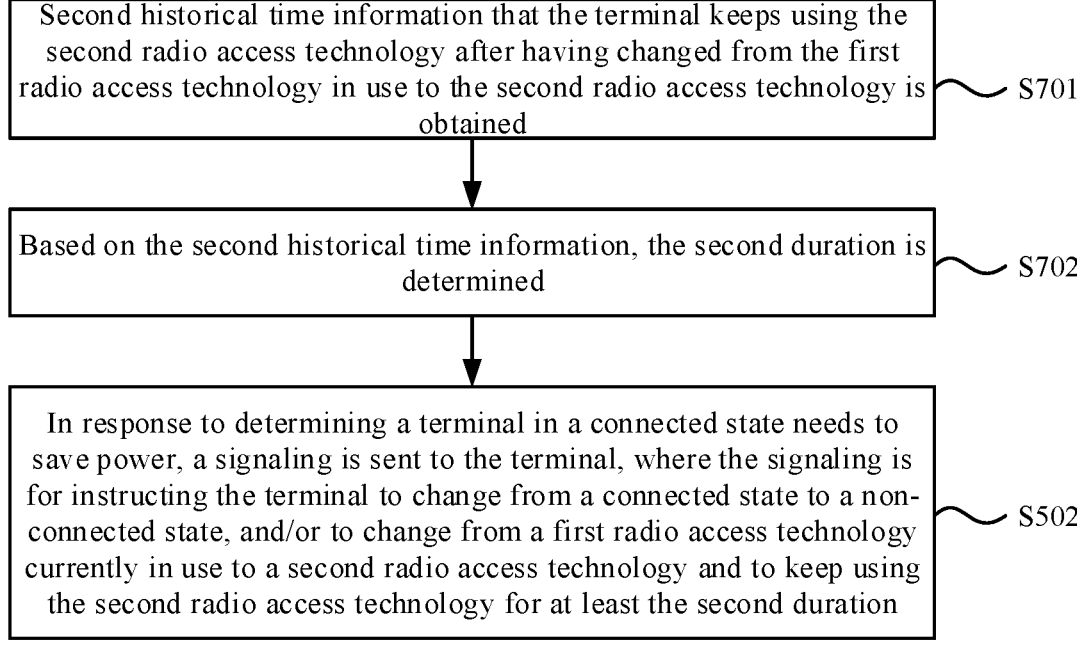

Second historical time information that the terminal keeps using the second radio access technology after having changed from the first radio access technology in use to the second radio access technology is obtained ~ S701

Based on the second historical time information, the second duration is determined ~ S702

In response to determining a terminal in a connected state needs to save power, a signaling is sent to the terminal, where the signaling is for instructing the terminal to change from a connected state to a non-connected state, and/or to change from a first radio access technology currently in use to a second radio access technology and to keep using the second radio access technology for at least the second duration ~ S502

FIG.7

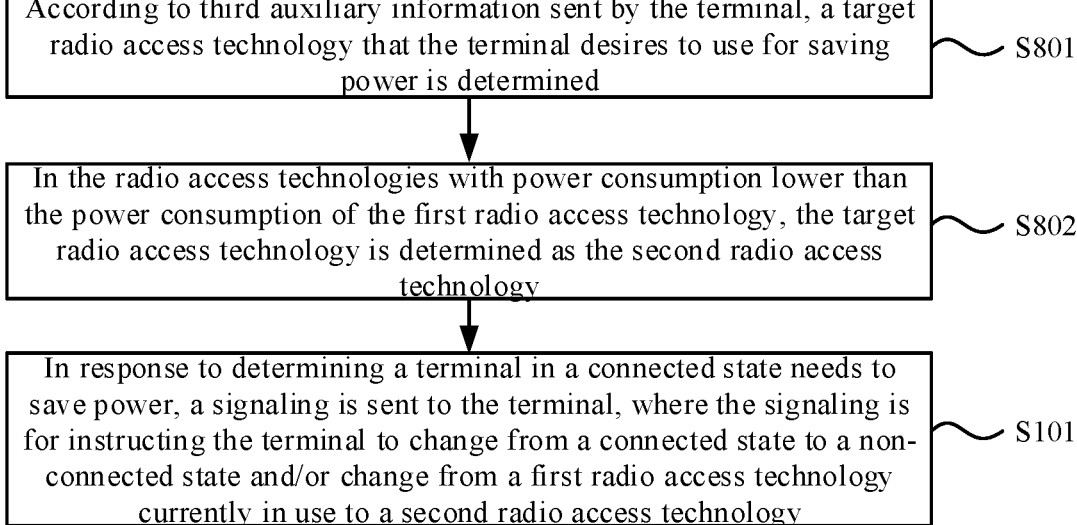

According to third auxiliary information sent by the terminal, a target radio access technology that the terminal desires to use for saving power is determined ~ S801

In the radio access technologies with power consumption lower than the power consumption of the first radio access technology, the target radio access technology is determined as the second radio access technology ~ S802

In response to determining a terminal in a connected state needs to save power, a signaling is sent to the terminal, where the signaling is for instructing the terminal to change from a connected state to a non-connected state and/or change from a first radio access technology currently in use to a second radio access technology ~ S101

FIG.8

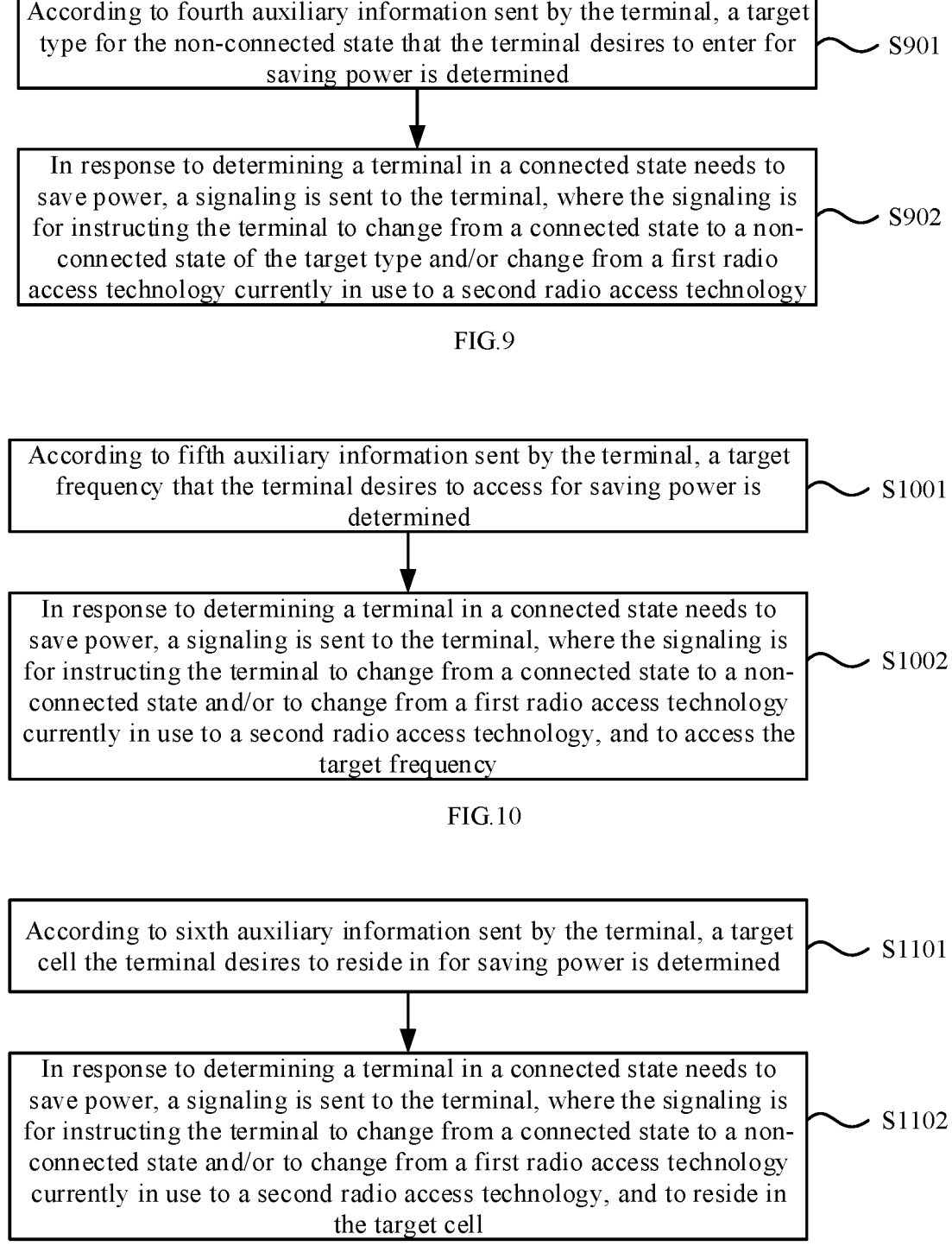

According to fourth auxiliary information sent by the terminal, a target type for the non-connected state that the terminal desires to enter for saving power is determined ~ S901

In response to determining a terminal in a connected state needs to save power, a signaling is sent to the terminal, where the signaling is for instructing the terminal to change from a connected state to a non-connected state of the target type and/or change from a first radio access technology currently in use to a second radio access technology ~ S902

FIG.9

According to fifth auxiliary information sent by the terminal, a target frequency that the terminal desires to access for saving power is determined ~ S1001

In response to determining a terminal in a connected state needs to save power, a signaling is sent to the terminal, where the signaling is for instructing the terminal to change from a connected state to a non-connected state and/or to change from a first radio access technology currently in use to a second radio access technology, and to access the target frequency ~ S1002

FIG.10

According to sixth auxiliary information sent by the terminal, a target cell the terminal desires to reside in for saving power is determined ~ S1101

In response to determining a terminal in a connected state needs to save power, a signaling is sent to the terminal, where the signaling is for instructing the terminal to change from a connected state to a non-connected state and/or to change from a first radio access technology currently in use to a second radio access technology, and to reside in the target cell ~ S1102

FIG.11

STATE CONTROL METHOD AND ELECTRONIC DEVICE

CROSS REFERENCE TO RELATED APPLICATIONS

The present application is a U.S. National Stage of International Application No. PCT/CN2020/117920 filed on Sep. 25, 2020, the contents of which are incorporated herein by reference in their entirety for all purposes.

TECHNICAL FIELD

The present disclosure relates to the field of communication technologies, and in particular, to a state control method and an electronic device.

BACKGROUND 5G standardization work has been completed. Along with deployment and improvement of 5G network, more and more manufacturers launch 5G smart phones. In order to save power of the smart phones, the network may, on Uu interfaces, configure Discontinuous Reception (DRX) for user equipments (UEs). The DRX configuration includes an inactivity timer, an on-duration timer, a cycle, a start offset, a uplink HARQ RTT timer, a downlink HARQ RTT timer, an uplink retransmission timer, and a downlink retransmission timer, and the like.

The cycle, the start offset, and the on-duration timer may be used to determine a start time point of a cycle for the on-duration timer. A UE monitors a physical downlink control channel (PDCCH) only during an on-duration time and may not monitor the PDCCH during other times, so as to reduce power consumption. The on-duration time includes operation periods of the on-duration timer, the inactivity timer, the uplink retransmission timer, and the downlink retransmission timer.

However, in the process of developing and using the 5G smart phones, it is found that even though DRX is configured, the power consumption of the 5G smart phones is much higher than that of 4G smart phones; and the power consumption of the 5G smart phones in a connected state or an idle state is also higher than that of the 4G smart phones.

SUMMARY

In view of this, embodiments of the present disclosure provide a state control method, a state control apparatus, an electronic device, and a computer-readable storage medium so as to solve the technical problems in the related arts.

According to a first aspect of embodiments of the present disclosure, there is provided a state control method, which is applied to a base station and includes: in response to determining a terminal in a connected state needs to save power, sending a signaling to the terminal, where the signaling is for instructing the terminal to change a communication state for communication with the base station.

According to a second aspect of embodiments of the present disclosure, there is provided an electronic device, including: a processor; and a memory storing instructions executable by the processor; where the processor is configured to perform steps including: in response to determining a terminal in a connected state needs to save power, sending a signaling to the terminal, where the signaling is for instructing the terminal to change a communication state for communication with the base station.

In the embodiments of the present disclosure, a signaling may be sent to a terminal which needs to save power and is in a connected state, such that the terminal is instructed based on the signaling to change a communication state with a base station, for example, to change from a connected state to a non-connected state and change from a first radio access technology currently in use to a second radio access technology.

BRIEF DESCRIPTION OF THE DRAWINGS

In order to more clearly describe the technical solutions of the embodiments of the present disclosure, the accompanying drawings involved in the descriptions of the embodiments will be briefly introduced below. Apparently, the accompanying drawings described below are only some embodiments of the present disclosure, and those of ordinary skill in the art can obtain other drawings based on these drawings without making creative work.

FIG. 1 is a schematic flowchart illustrating a state control method according to an embodiment of the present disclosure.

FIG. 2 is a schematic flowchart illustrating another state control method according to an embodiment of the present disclosure.

FIG. 3 is a schematic flowchart illustrating another state control method according to an embodiment of the present disclosure.

FIG. 4 is a schematic flowchart illustrating another state control method according to an embodiment of the present disclosure.

FIG. 5 is a schematic flowchart illustrating another state control method according to an embodiment of the present disclosure.

FIG. 6 is a schematic flowchart illustrating another state control method according to an embodiment of the present disclosure.

FIG. 7 is a schematic flowchart illustrating another state control method according to an embodiment of the present disclosure.

FIG. 8 is a schematic flowchart illustrating another state control method according to an embodiment of the present disclosure.

FIG. 9 is a schematic flowchart illustrating another state control method according to an embodiment of the present disclosure.

FIG. 10 is a schematic flowchart illustrating another state control method according to an embodiment of the present disclosure.

FIG. 11 is a schematic flowchart illustrating another state control method according to an embodiment of the present disclosure.

DETAILED DESCRIPTION OF THE EMBODIMENTS

Figure 12:
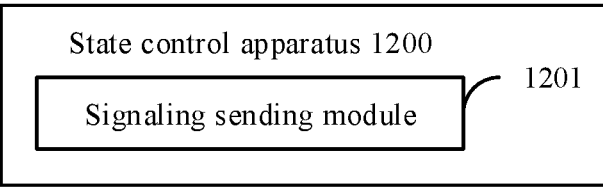
FIG. 12 is a schematic block diagram illustrating a state control apparatus according to an embodiment of the present disclosure.

The technical solutions of the embodiments of the present disclosure will be described clearly and fully below in combination with the accompanying drawings in the embodiments of the present disclosure. It is apparent that the described embodiments are merely some embodiments of the present disclosure rather than all embodiments. All other embodiments obtained by those of ordinary skill in the art based on the embodiments in the present disclosure, without making creative work, shall all fall into the scope of protection of the present disclosure.

FIG. 1 is a schematic flowchart illustrating a state control method according to an embodiment of the present disclosure. The state control method shown in this embodiment may be applied to a base station. The base station may include, but not be limited to, a base station in a communication system such as a 4G base station, a 5G base station, a 6G base station, and the like. The base station may communicate with a terminal serving as a user equipment, and the terminal may include, but not be limited to, an electronic device such as a smart phone, a tablet computer, a wearable device, a sensor, an internet-of-things device, and the like.

As shown in FIG. 1, the state control method may include step S101.

At step S101, in response to determining that a terminal in a connected state needs to save power, a signaling is sent to the terminal, where the signaling is for instructing the terminal to change a communication state for communication with the base station.

Changing, by the terminal, a communication state for communication with the base station includes at least one of the following: changing from a connected state to a non-connected state; or changing from a first radio access technology currently in use to a second radio access technology.

In an embodiment, when the terminal is in a connected state, the base station may determine whether the terminal needs to save power.

For example, the base station may receive information from the terminal and, based on the received information, determine that the terminal needs to save power. When a screen of the terminal is off for a greater time length than a preset time length, the terminal may send information to the base station, so as to indicate to the base station that the terminal needs to save power. When starting to play a locally-cached video, the terminal may send information to the base station, so as to indicate to the base station that the terminal needs to save power.

For example, the base station may obtain historical time information that the terminal performs a power-saving operation, where the historical time information may be obtained from a core network or from the base station per se and/or other base stations. And then, the base station may, based on the historical time information, determine whether the terminal needs to save power. For example, the terminal may shut down at a specific time (e.g., at 11 PM) each day. In this case, the power-saving operations of the terminal recorded by the core network may be deregistered, detached, and the like of the terminal, and the recorded historical time information may be the specific time. Thus, the base station may determine that the terminal needs to save power at a specific time each day.

It should be noted that the manners of determining whether the terminal needs to save power may include, without limitation, the above several manners, which may be set based on actual requirements.

For a terminal determined as needing to save power, whether the terminal is in a connected state may be further determined. The terminal in the connected state performs communication operations with more power consumption, for example, it needs to continuously monitor a downlink channel. This will lead to quick power consumption of the terminal, failing to satisfy the requirements of power saving.

In one or more embodiments of the present disclosure, for a terminal which needs to save power and is in a connected state, the terminal may be instructed based on a signaling to change a communication state for communication with the base station, such that the terminal communicates with the base station through a communication mode with less power consumption, thus reducing the power consumption and achieving power saving effect.

For example, a signaling may be sent to the terminal to instruct the terminal to change from the connected state to a non-connected state, and further instruct the terminal to change from the first radio access technology (RAT) currently in use to the second radio access technology.

When the terminal is in the non-connected state, the terminal may perform communication operations with less power consumption than in the connected state. Thus, the terminal may be changed from the connected state to the non-connected state to reduce the power consumption of the terminal, thus ensuring the power saving effect.

In an example, the power consumption of the second radio access technology is lower than the power consumption of the first radio access technology.

The power consumption of the second radio access technology is lower than the power consumption of the first radio access technology. For example, the first radio access technology may be 5G New Radio (NR) and the second radio access technology may be 4G Long Term Evolution (LTE), 3G, 2G, or the like. Hence, the terminal may be changed from the first radio access technology in use to the second radio access technology so as to reduce the power consumption of the terminal, thereby ensuring the power saving effect.

FIG. 2 is a schematic flowchart illustrating another state control method according to an embodiment of the present disclosure. As shown in FIG. 2, the method includes the following steps S201 and S202.

At step S201, a first duration for which the terminal needs to save power is determined.

At step S202, the signaling of step S101 is further for instructing the terminal to remain in the non-connected state for at least the first duration after having changed from the connected state to the non-connected state.

In an embodiment, the base station may determine the first duration for which the terminal needs to save power, and further instruct, by the signaling, the terminal having changed from the connected state to the non-connected state to remain in the non-connected state for at least the first duration. In this case, the terminal can remain in the non-connected state for the first duration for power saving, thus ensuring a good power saving effect.

In an example, signaling is used to set the timing length of a first-timer in the terminal to the first duration or infinite duration, where before the first timer expires, the terminal remains in a non-connected state.

In an embodiment, the signaling may be used to set the timing length of the first timer in the terminal to the first duration or infinite duration, such that the terminal remains in the non-connected state for at least the first duration after having changed from the connected state to the non-connected state.

For example, the non-connected state is an inactive state, and the first timer may be a T380. After the first timer is set to the first duration or infinite duration, the first timer can expire only when timing at least the first duration. Thus, it is ensured that the terminal can remain in the non-connected state during the first duration.

When the timing length of the first timer is set to an infinite duration, the terminal will not remain in the non-connected state infinitely but re-enter the connected state based on its own needs (e.g., user operations).

FIG. 3 is a schematic flowchart illustrating another state control method according to an embodiment of the present disclosure. As shown in FIG. 3, determining the first duration for which the terminal needs to save power includes the following step S301 and previously described S202.

At step S301, according to first auxiliary information sent by the terminal, the first duration is determined.

In an embodiment, the terminal may send the first auxiliary information carrying information relating to the first duration to the base station, such that the base station can determine the first duration based on the first auxiliary information.

The terminal may, when determining the terminal needs to save power, send the first auxiliary information to the base station, or send the first auxiliary information to the base station at other occasions.

FIG. 4 is a schematic flowchart illustrating another state control method according to an embodiment of the present disclosure. As shown in FIG. 4, determining the first duration for which the terminal needs to save power includes the following steps S401 and S402, and previously described S202.

At step S401, the first historical time information that the terminal remains in the non-connected state after having changed from the connected state to the non-connected state is obtained.

At step S402, based on the first historical time information, the first duration is determined.

In an embodiment, the base station may obtain the first historical time information that the terminal remains in the non-connected state after having changed from the connected to the non-connected state. The first historical time information may be obtained from the core network, or from the base station and/or other base stations. Then, the base station determines the first duration based on the first historical time information.

For example, the terminal enters the non-connected state from the connected state at 11 PM each day and remains in the non-connected state until 6 AM the next day. In this case, the first historical time information recorded by the base station may be 11 PM to 6 AM, and thus the base station can determine the first duration as from 11 PM to 6 AM of each day.

In an example, the non-connected state includes at least one of the following: an idle state or an inactive state.

In an embodiment, the signaling sent by the base station to the terminal may instruct the terminal to change from the connected state to the idle state or the inactive state. When determining the terminal needs to save power, the base station may determine a level of saving power that the terminal needs. If the level of saving power that the terminal needs is low, for example, if the terminal has a remaining power of less than 20% but greater than 5%, the signaling may instruct the terminal to enter the inactive state. If the level of saving power that the terminal needs is high, for example, if the remaining power is less than 5%, the signaling may instruct the terminal to enter an active state.

In an example, the non-connected state includes an inactive state, and the signaling includes a suspendConfig signaling.

In an embodiment, the base station may instruct through the suspendConfig signaling the terminal to enter the inactive state from the connected state.

In an example, the non-connected state includes an idle state, and the signaling is used to instruct the terminal to change from the connected state to the non-connected state and change from the first radio access technology currently in use to a second radio access technology.

In an embodiment, when the first radio access technology is 5G, the second radio access technology may be 4G, 3G, 2G, or the like. When the first radio access technology is 4G, the second radio access technology may be 3G, 2G, or the like, and so on.

In the current radio access technology, the inactive state and the idle state are present only in the 5G, and only the idle state, rather than the inactive state, is present in the 4G, 3G, and 2G. When the signaling instructs a terminal using 5G radio access technology to change from the connected state to the inactive state, it cannot instruct the terminal to change to using the radio access technology, such as 4G, 3G, or 2G, or the like, at the same time. When the signaling instructs a terminal using 5G radio access technology to change from the connected state to the idle state, it can also instruct the terminal to change to using the radio access technology, such as 4G, 3G, or 2G, or the like.

In an example, the signaling may include a Radio Resource Control Release (RRCRelease) signaling, which includes a deprioritisation request (deprioritisationReq) information unit. The deprioritisationReq information unit is used to instruct the terminal to change from the first radio access technology currently in use to the second radio access technology.

In an embodiment, the base station may instruct the terminal to change from the connected state to the idle state through the RRCRelease signaling and may also instruct, through the deprioritisationReq information unit in the signaling, the terminal to change from the first radio access technology in use to the second radio access technology at the same time. In this way, two instructions can be sent through one signaling, thus improving the utilization rate of the signaling.

In an example, a value of deprioritisation Type in the deprioritisationReq information unit is nr.

In an embodiment, in the deprioritisationReq information unit, the base station may set the value of the deprioritisationType to nr, so as to instruct the terminal to lower the priority of the 5G NR. In this way, when the terminal is using the 5G radio access technology, the terminal may be changed to use another radio access technology.

FIG. 5 is a schematic flowchart illustrating another state control method according to an embodiment of the present disclosure. As shown in FIG. 5, the method includes the following steps S501 and S502.

At step S501, a second duration for which the terminal needs to save power is determined.

At step S502, the signaling of step S101 is further used to instruct the terminal to keep using the second radio access technology for at least the second duration after having changed from the first radio access technology in use to the second radio access technology.

In an embodiment, the base station may determine the second duration for which the terminal needs to save power (may be the same as the first duration in the above embodiment), and further instruct, based on the signaling, the terminal to keep using the second radio access technology for at least the second duration after having changed from the first radio access technology in use to the second radio access technology. In this case, the terminal can keep using the second radio access technology with less power consumption during the second duration for power saving, thus ensuring a good power saving effect.

In an example, the signaling is used to set a timing length of a second timer in the terminal to the second duration or infinite duration, where the terminal keeps using the second radio access technology before the second timer expires.

In an embodiment, the signaling may be used to set the timing length of the second timer in the terminal to the second duration or infinite duration, such that the terminal keeps using the second radio access technology for at least the second duration after having changed from the first radio access technology in use to the second radio access technology.

For example, the second timer may be a deprioritisation Timer. After the second timer is set to the second duration or infinite duration, the second timer can expire only when timing at least the second duration. In this way, it is guaranteed that the terminal can keep using the second radio access technology with less power consumption during the second duration.

When the timing length of the second timer is set to the infinite duration, the terminal will not keep using the second radio access technology infinitely but re-use the first radio access technology based on its own needs (e.g. user operation).

FIG. 6 is a schematic flowchart illustrating another state control method according to an embodiment of the present disclosure. As shown in FIG. 6, determining the second duration for which the terminal needs to save power includes the following steps S601 and previously described S502.

At step S601, according to the second auxiliary information sent by the terminal, the second duration is determined.

In an embodiment, the terminal may send the second auxiliary information carrying information relating to the second duration to the base station, such that the base station can determine the second duration based on the second auxiliary information.

The terminal may, when determining that the terminal needs to save power, send the second auxiliary information to the base station, or send the second auxiliary information to the base station at other occasions.

It is noted that the auxiliary information recorded in all embodiments may be carried in one piece of information and then sent by the terminal to the base station. For example, the auxiliary information is carried in a UEAssistanceInformation signaling and then sent to the base station. In a further example, the auxiliary information may be carried in a ReleasePreference information unit of the UEAssistanceInformation signaling and then sent to the base station.

FIG. 7 is a schematic flowchart illustrating another state control method according to an embodiment of the present disclosure. As shown in FIG. 7, determining the second duration for which the terminal needs to save power includes the following steps S701 and S702, and previously described S502.

At step S701, the second historical time information is obtained, namely that the terminal keeps using the second radio access technology after having changed from the first radio access technology in use to the second radio access technology.

At step S702, based on the second historical time information, the second duration is determined.

In an embodiment, the base station may obtain the second historical time information that the terminal keeps using the second radio access technology after having changed from the first radio access technology to the second radio access technology (may be the same as the first historical time information in the above embodiment). The second historical time information may be obtained from a core network or from the base station and/or other base stations. Then, the base station may determine the second duration based on the second historical time information.

For example, the terminal changes from the first radio access technology in use to the second radio access technology at 11 PM each day and keeps using the second radio access technology until 6 AM the next day. In this case, the second historical time information recorded by the base station may be 11 PM to 6 AM, and thus the base station can determine the second duration as from 11 PM to 6 AM of each day.

FIG. 8 is a schematic flowchart illustrating another state control method according to an embodiment of the present disclosure. As shown in FIG. 8, determining the second duration for which the terminal needs to save power includes the following steps S801 and S802, and previously described S101.

At step S801, according to third auxiliary information sent by the terminal, a target radio access technology that the terminal desires to use for saving power is determined.

At step S802, in the radio access technologies with power consumption lower than the power consumption of the first radio access technology, the target radio access technology is determined as the second radio access technology.

In an embodiment, the terminal sends third auxiliary information to the base station to indicate to the base station about the target radio access technology the terminal desires to use for saving power. The base station, when determining the terminal needs to save power, may determine the target radio access technology as the second radio access technology from the radio access technologies with power consumption lower than the power consumption of the first radio access technology. Thus, the terminal is instructed by the signaling to use the second radio access technology to help ensure the terminal uses the radio access technology the terminal desires to use, thereby satisfying the needs of the terminal.

For example, the terminal is using the first radio access technology, 5G, whereas the target radio access technology the terminal desires to use is 3G. In this case, when determining the terminal needs to save power, the base station may determine 3G as the second radio access technology in 4G, 3G, and 2G, and instruct, by using the signaling, the terminal to change from 5G in use to 3G.

FIG. 9 is a schematic flowchart illustrating another state control method according to an embodiment of the present disclosure. As shown in FIG. 9, the method includes the following steps S901 and S902.

At step S901, according to the fourth auxiliary information sent by the terminal, the target type of the non-connected state that the terminal desires to enter for saving power is determined.

At step S902, the signaling of S101 is further used to instruct the terminal to change from the connected state to the non-connected state of the target type.

In an embodiment, the terminal may send the fourth auxiliary information to the base station to indicate to the base station about the target type of the non-connected state that the terminal desires to use for saving power. The base station, when determining the terminal needs to save power, may instruct, by the signaling, the terminal to enter the non-connected state of the target type. This helps ensure the terminal can enter the non-connected state that the terminal desires to enter, thereby satisfying the needs of the terminal.

For example, the non-connected state of the target type that the terminal desires to use is the idle state. Thus, the base station may, when determining the terminal needs to save power, instruct, by the signaling, the terminal to enter the idle state from the connected state.

FIG. 10 is a schematic flowchart illustrating another state control method according to an embodiment of the present disclosure. As shown in FIG. 10, the method includes the following steps: S1001 and S1002.

At step S1001, according to fifth auxiliary information sent by the terminal, a target frequency that the terminal desires to access for saving power is determined.

At step S1002, the signaling of S101 is further used to instruct the terminal to access the target frequency after having entered the non-connected state and/or having used the second radio access technology.

In an embodiment, the terminal may send the fifth auxiliary information to the base station to indicate to the base station about the target frequency that the terminal desires to access for saving power. The base station, when determining the terminal needs to save power, may instruct by the signaling, the terminal to access the target frequency, which helps ensure the terminal accesses the frequency that the terminal desires to access, thereby satisfying the needs of the terminal.

For example, the bandwidth of the second radio access technology includes a first frequency and a second frequency. When the target frequency that the terminal desires to access is the first frequency, the base station, in response to determining the terminal needs to save power, may instruct the terminal, by signaling, the terminal to use the second radio access technology and specifically access the first frequency in the bandwidth of the second radio access technology.

It is to be noted that the fifth auxiliary information may be a specific frequency value, based on which the base station can directly determine the target frequency. The fifth auxiliary information may also be frequency priorities, based on which the base station can determine whether the frequencies corresponding to the priorities are available one by one, and then determine the frequency of the highest priority in the available frequencies as the target frequency. For example, the base station firstly determines whether a frequency f1 of the highest priority is available, and if unavailable, determines whether a frequency f2 of the second highest priority is available, and if available, determines the frequency f2 as the target frequency.

FIG. 11 is a schematic flowchart illustrating another state control method according to an embodiment of the present disclosure. As shown in FIG. 11, the method includes the following steps S1101 and S1102.

At step S1101, according to sixth auxiliary information sent by the terminal, a target cell the terminal desires to reside in for saving power is determined.

At step S1102, the signaling of step S101 is further used to instruct the terminal to reside in the target cell after having entered the non-connected state and/or having used the second radio access technology.

In an embodiment, the terminal may send the sixth auxiliary information to the base station to indicate to the base station about the target cell that the terminal desires to reside in for saving power. The base station, when determining the terminal needs to save power, may instruct, by the signaling, the terminal to reside in the target cell, which helps ensure the terminal resides in the target cell that the terminal desires to reside in, thereby satisfying the needs of the terminal.

An embodiment of the present disclosure further provides a control request method, which is applied to a terminal. The terminal includes, but is not limited to, an electronic device, such as a smartphone, a tablet computer, a wearable device, a sensor, an internet-of-things device, and the like. The terminal may serve as a user equipment to communicate with a base station. The base station may be the base station shown in any one of the above embodiments.

The control request method may include the following steps: in response to determining the terminal in a connected state needs to save power, sending auxiliary information to the base station, where the auxiliary information is used to request the base station to change the terminal from a connected state to a non-connected state and/or from a first radio access technology currently in use to a second radio access technology.

In an example, the method further includes: receiving a signal from the base station; based on the signal, changing a communication state for communication with the base station.

In an example, changing a communication state for communication with the base station includes at least one of the following: changing from a connected state to a non-connected state; and changing from the first radio access technology currently in use to the second radio access technology.

In an example, the method further includes: based on the signaling, setting a timing length of a first timer to a first duration or infinite duration, and remaining in the non-connected state before the first timer expires.

In an example, the non-connected state includes at least one of the following:

an idle state or an inactive state.

In an example, the method further includes: based on the signaling, setting a timing length of a second timer to a second duration or infinite duration, and continuing to use the second radio access technology before the second timer expires.

In an example, the method further includes: sending third auxiliary information to the base station, where the third auxiliary information is used to indicate to the base station about a target radio access technology that the terminal desires to use for saving power.

In an example, the method further includes: sending fourth auxiliary information to the base station, where the fourth auxiliary information is used to indicate to the base station about a target type of the non-connected state that the terminal desires to enter for saving power.

In an example, the method further includes: sending fifth auxiliary information to the base station, where the fifth auxiliary information is used to indicate to the base station about a target frequency that the terminal desires to access for saving power.

In an example, the method further includes: sending sixth auxiliary information to the base station, where the sixth auxiliary information is used to indicate to the base station about a target cell that the terminal desires to reside in for saving power.

Corresponding to the embodiments of the above state control method, the present disclosure further provides an embodiment of a state control apparatus.

FIG. 12 is a block diagram illustrating a state control apparatus 1200 according to an embodiment of the present disclosure. The state control apparatus 1200 shown in the present embodiment may be applied to a base station. The base station may include, but not be limited to, a 4G base station, a 5G base station, a 6G base station, and the like in a communication system. The base station may communicate with a terminal serving as user equipment. The terminal may include, but not be limited to, any electronic device such as a smartphone, a tablet computer, a wearable device, a sensor, and an Internet of Things device.

As shown in FIG. 12, the state control apparatus 1200 may include a signaling sending module 1201.

The signaling sending module 1201 is configured to, in response to determining a terminal in a connected state needs to save power, send a signaling to the terminal, where the signaling is for instructing the terminal to change a communication state for communication with the base station.

In an example, changing, by the terminal, a communication state for communication with the base station includes at least one of the following: changing from a connected state to a non-connected state; or changing from a first radio access technology currently in use to a second radio access technology.

Figure 13:
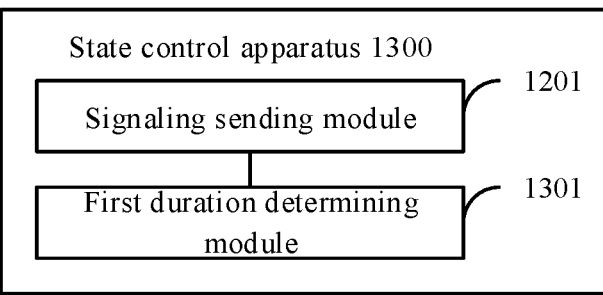
FIG. 13 is a schematic block diagram illustrating another state control apparatus according to an embodiment of the present disclosure.

FIG. 13 is a block diagram illustrating another state control apparatus 1300 according to an embodiment of the present disclosure. As shown in FIG. 13, the apparatus 1300 includes the signaling sending module 1201 and a first duration determining module 1301. The first duration determining module 1301, configured to determine a first duration for which the terminal needs to save power, where the signaling is further for instructing the terminal to remain in the non-connected state for at least the first duration after having changed from the connected state to the non-connected state.

In an example, the signaling is for setting a timing length of a first timer in the terminal to the first duration or infinite duration, where before the first timer expires, the terminal remains in the non-connected state.

In an example, the first duration determining module is configured to, according to first auxiliary information sent by the terminal, determine the first duration.

In an example, the first duration determining module 1301 is configured to obtain first historical time information that the terminal remains in the non-connected state after having changed from the connected state to the non-connected state, and based on the first historical time information, determine the first duration.

In an example, the non-connected state includes at least one of the following: an idle state or an inactive state.

In an example, the non-connected state includes the inactive state, and the signaling includes a suspendConfig signaling.

In an example, the non-connected state includes the idle state, and the signaling is used to instruct the terminal to change from the connected state to the non-connected state, and change from the first radio access technology currently in use to the second radio access technology.

In an example, the signaling includes an RRCRelease signaling, the RRCRelease signaling includes a deprioritisationReq information unit, and the deprioritisationReq information unit is used to instruct the terminal to change from the first radio access technology currently in use to the second radio access technology.

In an example, a value of deprioritisation Type in the deprioritisationReq information unit is nr.

Figure 14:
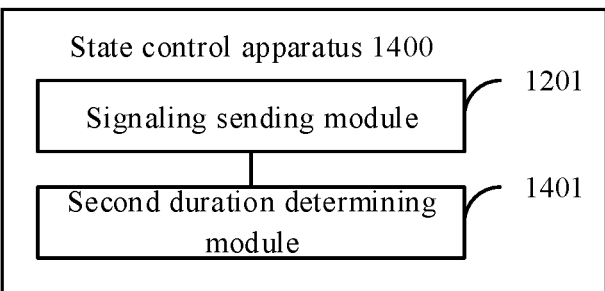
FIG. 14 is a schematic block diagram illustrating another state control apparatus according to an embodiment of the present disclosure.

FIG. 14 is a block diagram illustrating another state control apparatus 1400 according to an embodiment of the present disclosure. As shown in FIG. 14, the apparatus 1400 includes the signaling sending module 1201 and further includes a second duration determining module 1401.

The second duration determining module 1401 is configured to determine a second duration for which the terminal needs to save power. Where the signaling is further used to instruct the terminal to keep using the second radio access technology for at least the second duration after having changed from the first radio access technology in use to the second radio access technology.

In an example, the signaling is used to set a timing length of a second timer in the terminal to the second duration or infinite duration, where the terminal keeps using the second radio access technology before the second timer expires.

In an example, the second duration determining module is configured to, according to second auxiliary information sent by the terminal, determine the second duration.

In an example, the second duration determining module 1401 is configured to obtain second historical time information that the terminal keeps using the second radio access technology after having changed from the first radio access technology in use to the second radio access technology; and based on the second historical time information, determine the second duration.

In an example, the second duration determining module 1401 is configured to, according to third auxiliary information sent by the terminal, determine a target radio access technology the terminal desires to use for saving power. Further, from the radio access technologies with power consumption lower than the power consumption of the first radio access technology, determine the target radio access technology as the second radio access technology.

Figure 15:
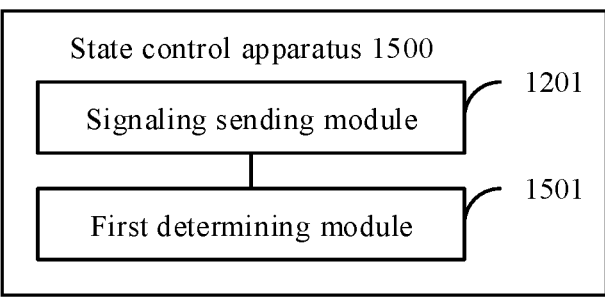
FIG. 15 is a schematic block diagram illustrating another state control apparatus according to an embodiment of the present disclosure.

FIG. 15 is a block diagram illustrating another state control apparatus 1500 according to an embodiment of the present disclosure. As shown in FIG. 15, the apparatus 1500 includes the signaling sending module 1201 and further includes a first determining module 1501.

The first determining module 1501 is configured to, according to fourth auxiliary information sent by the terminal, determine a target type of the non-connected state the terminal desires to enter for saving power. Where the signaling is used to instruct the terminal to change from the connected state to the non-connected state of the target type.

Figure 16:
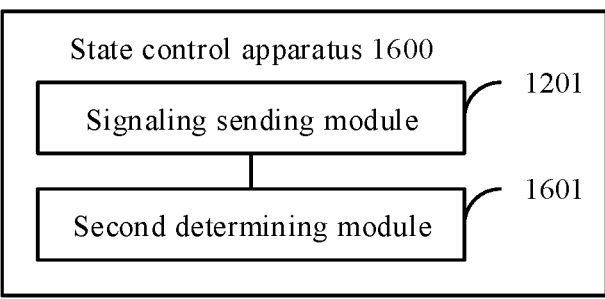
FIG. 16 is a schematic block diagram illustrating another state control apparatus according to an embodiment of the present disclosure.

FIG. 16 is a block diagram illustrating another state control apparatus 1600 according to an embodiment of the present disclosure. As shown in FIG. 16, the apparatus 1600 includes the signaling sending module 1201 and further includes a second determining module 1601.

The second determining module 1601 is configured to, according to fifth auxiliary information sent by the terminal, determine a target frequency the terminal desires to access for saving power. Where the signaling is further used to instruct the terminal to access the target frequency after having entered the non-connected state and/or having used the second radio access technology.

Figure 17:
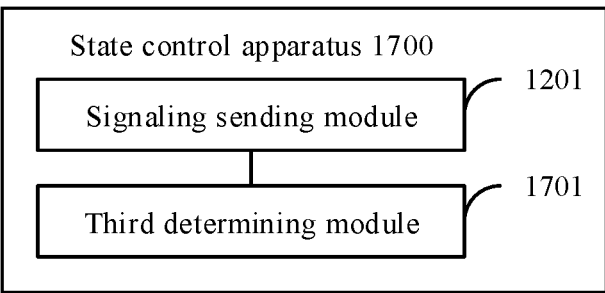
FIG. 17 is a schematic block diagram illustrating another state control apparatus according to an embodiment of the present disclosure.

FIG. 17 is a block diagram illustrating another state control apparatus 1700 according to an embodiment of the present disclosure. As shown in FIG. 17, the apparatus 1700 includes the signaling sending module 1201 and further includes a third determining module 1701.

The third determining module 1701, configured to, based on sixth auxiliary information sent by the terminal, determine a target cell the terminal desires to reside in for saving power. Where the signaling is further used to instruct the terminal to reside in the target cell after having entered the non-connected state and/or having used the second radio access technology.

In an example, the power consumption of the second radio access technology is lower than the power consumption of the first radio access technology.

The specific manners in which each module in the apparatus of the above embodiments performs operation have been detailed in the embodiments of the relevant method and will not be repeated herein.

Since the apparatus embodiments substantially correspond to the method embodiments, reference may be made to the descriptions of the method embodiments for the related part. The apparatus embodiments described above are merely illustrative, where the modules described as separate members may or may not be physically separated, and the members displayed as modules may or may not be physical modules, i.e., may be located in one place, or may be distributed to a plurality of network modules. Part or all of the modules may be selected according to actual requirements to implement the objectives of the solutions in the embodiments. Those of ordinary skill in the art may understand and carry them out without creative work.

An embodiment of the present disclosure further provides an electronic device, including: a processor; and a memory storing instructions executable by the processor; where the processor is configured to perform the method of any one of the above embodiments.

An embodiment of the present disclosure further provides a computer-readable storage medium storing a computer program, where the program is executed by a processor to perform the steps in the method of any one of the above embodiments.

Figure 18:
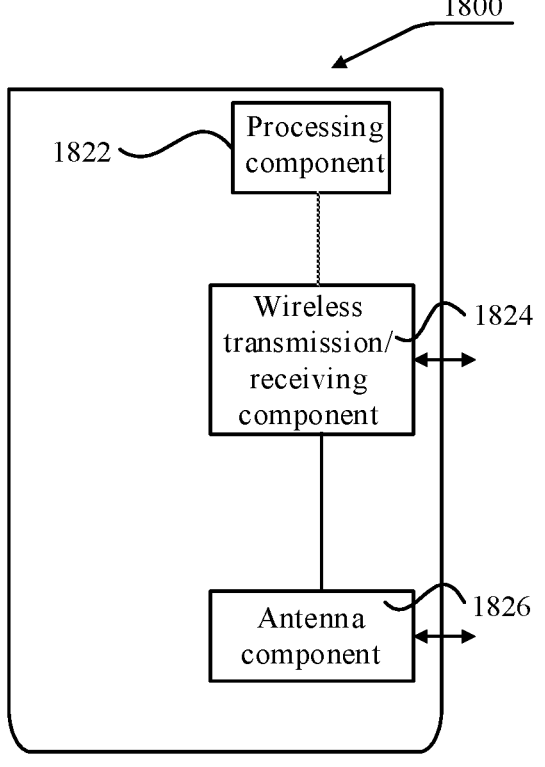
FIG. 18 is a schematic block diagram illustrating an apparatus for state control according to an embodiment of the present disclosure.

FIG. 18 is a block diagram illustrating an apparatus 1800 for state control according to an embodiment of the present disclosure. The apparatus 1800 may be provided as a base station. By referring to FIG. 18, the apparatus 1800 includes a processing component 1822, a wireless transmission/receiving component 1824, an antenna component 1826, and a signal processing part specific to a wireless interface. The processing component 1822 may further include one or more processors. One processor in the processing component 1822 can be configured to perform the above state control method.

Figure 19:
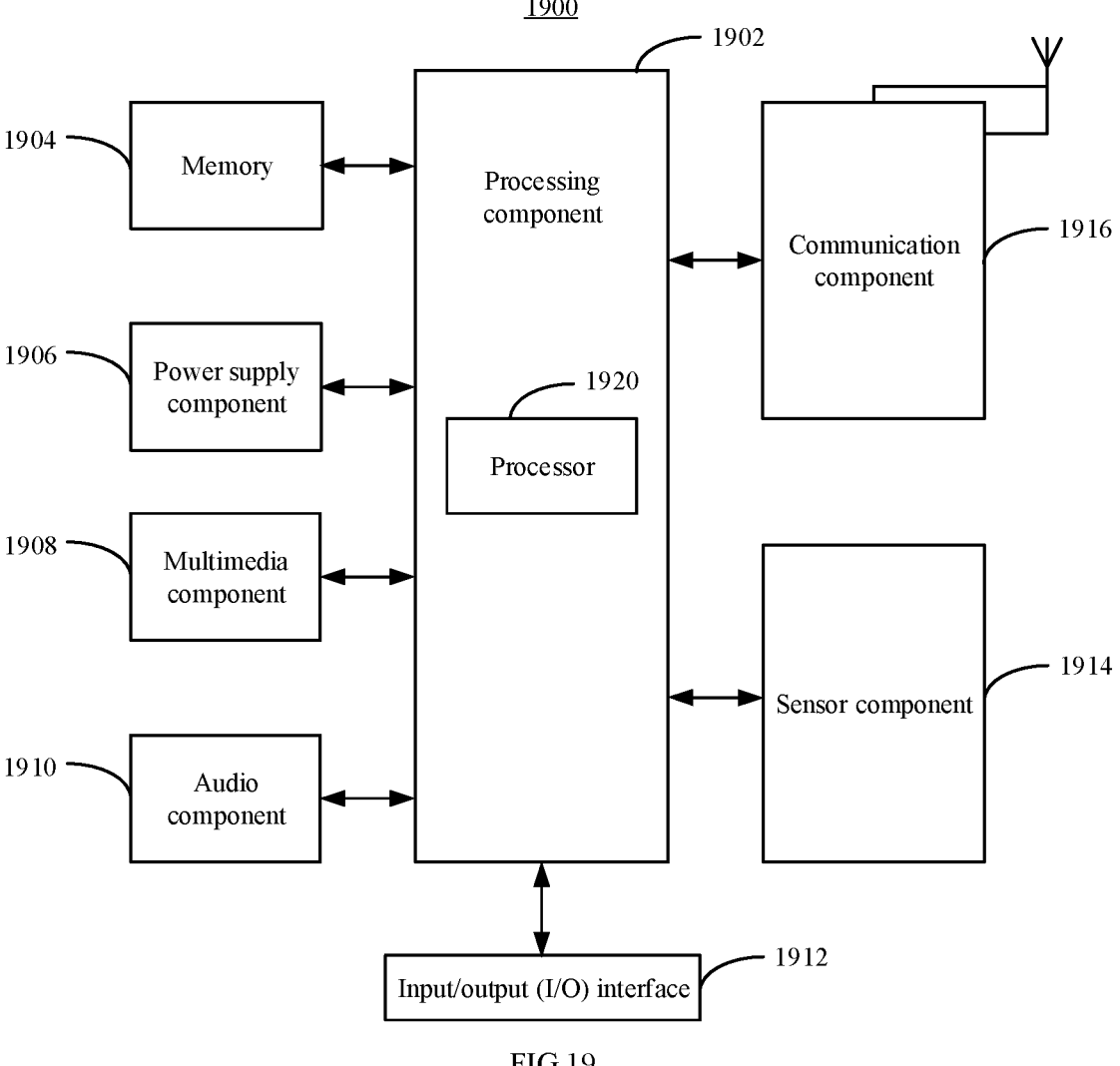
FIG. 19 is a schematic block diagram illustrating an apparatus for a control request according to an embodiment of the present disclosure.

FIG. 19 is a block diagram of an apparatus 1900 for a control request according to an embodiment of the present disclosure. For example, the apparatus 1900 may be a mobile phone, a computer, a digital broadcast terminal, a message transceiver, a game console, a tablet device, a medical device, a fitness device, a personal digital assistant, and the like.

As shown in FIG. 19, the apparatus 1900 may include one or more of the following components: a processing component 1902, a memory 1904, a power supply component 1906, a multimedia component 1908, an audio component

1910, an input/output (I/O) interface 1912, a sensor component 1914, and a communication component 1916.

The processing component 1902 generally controls overall operations of the apparatus 1900, such as operations associated with display, phone calls, data communications, camera operations, and recording operations. The processing component 1902 may include one or more processors 1920 to execute instructions to complete all or part of the steps of the above method. In addition, the processing component 1902 may include one or more modules that facilitate the interaction between the processing component 1902 and other components. For example, the processing component 1902 may include a multimedia module to facilitate the interaction between the multimedia component 1908 and the processing component 1902.

The memory 1904 is configured to store various types of data to support the operation of the apparatus 1900. Examples of such data include instructions for any application or method operated on the apparatus 1900, contact data, phonebook data, messages, pictures, videos, and so on. The memory 1904 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1906 supplies power for different components of the apparatus 1900. The power supply component 1906 may include a power supply management system, one or more power supplies, and other components associated with generating, managing, and distributing power for the apparatus 1900.

The multimedia component 1908 includes a screen that provides an output interface between the apparatus 1900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1908 includes a front camera and/or a rear camera. When the apparatus 1900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1910 is configured to output and/or input audio signals. For example, the audio component 1910 includes a microphone (MIC) configured to receive an external audio signal when the apparatus 1900 is in an operation mode, such as a call mode, a recording mode, and a voice recognition mode. The received audio signal may be further stored in the memory 1904 or transmitted via the communication component 1916. In some examples, the audio component 1910 also includes a loudspeaker for outputting an audio signal.

The I/O interface 1912 provides an interface between the processing component 1902 and a peripheral interface module, which may be a keyboard, a click wheel, a button, or the like. These buttons may include, but are not limited to, a home button, a volume button, a start button, and a lock button.

The sensor component 1914 includes one or more sensors for providing a status assessment in various aspects to the apparatus 1900. For example, the sensor component 1914 may detect an open/closed state of the apparatus 1900, and the relative positioning of components, for example, the component is a display and a keypad of the apparatus 1900. The sensor component 1914 may also detect a change in position of the apparatus 1900 or a component of the apparatus 1900, the presence or absence of a user in contact with the apparatus 1900, the orientation or acceleration/deceleration of the apparatus 1900, and a change in temperature of the apparatus 1900. The sensor component 1914 may include a proximity sensor configured to detect the presence of nearby objects without any physical contact. The sensor component 1914 may also include a light sensor, such as a CMOS or CCD image sensor, for use in imaging applications. In some examples, the sensor component 1914 may also include an acceleration sensor, a gyro sensor, a magnetic sensor, a pressure sensor, or a temperature sensor.

The communication component 1916 is configured to facilitate wired or wireless communication between the apparatus 1900 and other devices. The apparatus 1900 may access a wireless network based on a communication standard, such as WiFi, 2G, or 3G, or a combination thereof. In an example, the communication component 1916 receives broadcast signals or broadcast associated information from an external broadcast management system via a broadcast channel. In an example, the communication component 1916 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the apparatus 1900 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above control request method.

In an example, there is also provided a non-transitory computer readable storage medium, such as a memory 1904 including computer program instructions, where the instructions are executable by the processor 1920 of the apparatus 1900 to perform the control request method as described above. For example, the non-transitory computer readable storage medium may be a Read Only Memory (ROM), a Random Access Memory (RAM), a CD-ROM, a magnetic tape, a floppy disk and an optical data storage device and the like.

Other implementations of the present disclosure will be apparent to those skilled in the art from consideration of the specification and practice of the present disclosure herein. The present disclosure is intended to cover any variations, uses, modifications, or adaptations of the present disclosure that follow the general principles thereof and include common knowledge or conventional technical means in the related art that are not disclosed in the present disclosure. The specification and examples are considered exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded from including additional elements present in a process, method, article, or device, including the elements.

The above are detailed descriptions of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A state control method, applied to a base station, comprising:

in response to determining a terminal in a connected state needs to save power, sending a signaling to the terminal, wherein the signaling is for instructing the terminal to change a communication state for communication with the base station;

wherein the method further comprises:

determining a duration for which the terminal needs to save power;

wherein the signaling is further for instructing the terminal to remain in a new communication state for at least the duration after having changed the communication state for communication with the base station;

wherein the determining the duration for which the terminal needs to save power comprises:

obtaining historical time information that the terminal remains in the new communication state after having changed the communication state for communication with the base station; and according to the historical time information, determining the duration for which the terminal needs to save power.

2. The state control method of claim 1, wherein the terminal changing the communication state for communication with the base station comprises at least one of:

changing from a connected state to a non-connected state; or changing from a first radio access technology currently in use to a second radio access technology.

3. The state control method of claim 2, wherein the terminal changing the communication state for communication with the base station comprises changing from the connected state to the non-connected state, and the determining the duration for which the terminal needs to save power comprises:

determining a first duration for which the terminal needs to save power;

wherein the signaling is further for instructing the terminal to remain in the non-connected state for at least the first duration after having changed from the connected state to the non-connected state.

4. The state control method of claim 3, wherein the signaling is for setting a timing length of a first timer in the terminal to the first duration or infinite duration, the terminal remaining in the non-connected state before the first timer expires.

5. The state control method of claim 3, wherein determining the first duration for which the terminal needs to save power comprises:

according to first auxiliary information sent by the terminal, determining the first duration.

6. The state control method of claim 3, wherein determining the first duration for which the terminal needs to save power comprises:

obtaining first historical time information that the terminal remains in the non-connected state after having changed from the connected state to the non-connected state; and according to the first historical time information, determining the first duration.

7. The state control method of claim 2, wherein the non-connected state comprises at least one of:

an idle state or an inactive state.

8. The state control method of claim 7, wherein the non-connected state comprises the inactive state, and the signaling comprises a suspendConfig signaling.

9. The state control method of claim 7, wherein the non-connected state comprises the idle state, and the signaling is for instructing the terminal to change from the connected state to the idle state, and change from the first radio access technology currently in use to the second radio access technology.

10. The state control method of claim 9, wherein the signaling comprises an RRCRelease signaling, the RRCRelease signaling comprises a deprioritisationReq information unit, and the deprioritisationReq information unit is for instructing the terminal to change from the first radio access technology currently in use to the second radio access technology.

11. The state control method of claim 10, wherein a value of deprioritisationType in the deprioritisationReq information unit is nr.

12. The state control method of claim 9, wherein the determining the duration for which the terminal needs to save power comprises:

determining a second duration for which the terminal needs to save power;

wherein the signaling is further for instructing the terminal to keep using the second radio access technology for at least the second duration after having changed from the first radio access technology in use to the second radio access technology.

13. The state control method of claim 12, wherein the signaling is for setting a timing length of a second timer in the terminal to the second duration or infinite duration, the terminal keeping using the second radio access technology before the second timer expires.

14. The state control method of claim 12, wherein determining the second duration for which the terminal needs to save power comprises:

according to second auxiliary information sent by the terminal, determining the second duration.

15. The state control method of claim 12, wherein determining the second duration for which the terminal needs to save power comprises:

obtaining second historical time information that the terminal keeps using the second radio access technology after having changed from the first radio access technology in use to the second radio access technology; and according to the second historical time information, determining the second duration.

16. The state control method of claim 9, wherein determining the second radio access technology comprises:

according to third auxiliary information sent by the terminal, determining a target radio access technology desired by the terminal for saving power; and from radio access technologies with a power consumption lower than a power consumption of the first radio access technology, determining the target radio access technology as the second radio access technology.

17. The state control method of claim 7, further comprising:

according to fourth auxiliary information sent by the terminal, determining a target type of the non-connected state that the terminal desires to enter for saving power, wherein the signaling is for instructing the terminal to change from the connected state to the non-connected state of the target type.

18. The state control method of claim 2, further comprising:

according to fifth auxiliary information sent by the terminal, determining a target frequency that the terminal desires to access for saving power;

wherein the signaling is further for instructing the terminal to access the target frequency after having entered the non-connected state and/or having used the second radio access technology.

19. The state control method of claim 2, further comprising:

according to sixth auxiliary information sent by the terminal, determining a target cell that the terminal desires to reside for saving power;

wherein the signaling is further for instructing the terminal to reside in the target cell after having entered the non-connected state and/or having used the second radio access technology.

20. An electronic device, comprising:

a processor; and a memory storing instructions executable by the processor;

wherein the processor is configured to perform steps comprising:

in response to determining a terminal in a connected state needs to save power, sending a signaling to the terminal, wherein the signaling is for instructing the terminal to change a communication state for communication with a base station;

wherein the processor is further configured to determine a duration for which the terminal needs to save power;

wherein the signaling is further for instructing the terminal to remain in a new communication state for at least the duration after having changed the communication state for communication with the base station;

wherein when determining the duration for which the terminal needs to save power, the processor is further configured to:

obtain historical time information that the terminal remains in the new communication state after having changed the communication state for communication with the base station; and according to the historical time information, determine the duration for which the terminal needs to save power.

* * * * *